US010098325B2

(12) United States Patent
Monks

(10) Patent No.: US 10,098,325 B2
(45) Date of Patent: Oct. 16, 2018

(54) ANIMAL ALIGNMENT SUPPORT SYSTEM

(71) Applicant: Steven M. Monks, Peyton, CO (US)

(72) Inventor: Steven M. Monks, Peyton, CO (US)

(*) Notice: Subject to any disclaimer, the term of this patent is extended or adjusted under 35 U.S.C. 154(b) by 247 days.

(21) Appl. No.: 15/043,192

(22) Filed: Feb. 12, 2016

(65) Prior Publication Data
US 2016/0235037 A1 Aug. 18, 2016

Related U.S. Application Data

(60) Provisional application No. 62/176,240, filed on Feb. 13, 2015.

(51) Int. Cl.
*A01K 15/00* (2006.01)
*A01K 15/04* (2006.01)

(52) U.S. Cl.
CPC .................... *A01K 15/04* (2013.01)

(58) Field of Classification Search
CPC ........ A01K 1/06; A01K 1/0613; A01K 1/062; A01K 1/0606; A01K 1/08; A01K 15/04; A01K 15/00; A01K 15/02; A01K 15/028; A01K 17/00; A63K 3/02; A63K 3/026
USPC .......................................................... 119/749
See application file for complete search history.

(56) References Cited

U.S. PATENT DOCUMENTS

| | | | | | |
|---|---|---|---|---|---|
| 36,920 | A | * | 11/1862 | Sinclair | A01K 1/0613 119/725 |
| 125,120 | A | * | 4/1872 | Cox | A01K 1/0613 119/736 |
| 211,434 | A | * | 1/1879 | Thatcher | A01K 1/0613 119/734 |
| 363,902 | A | * | 5/1887 | McCartney | A01K 1/062 119/749 |
| 366,100 | A | * | 7/1887 | Hipp | A01K 1/08 119/777 |
| 684,720 | A | * | 10/1901 | Reid | A01K 1/062 119/738 |
| 713,522 | A | * | 11/1902 | Steiner | A01K 1/08 119/777 |

(Continued)

FOREIGN PATENT DOCUMENTS

| | | | | |
|---|---|---|---|---|
| CA | 2556955 A1 | * | 9/2005 | ............. A01K 15/00 |
| CA | 2530636 A1 | * | 6/2006 | ........... A01K 1/0613 |

(Continued)

*Primary Examiner* — Marc Burgess
*Assistant Examiner* — Morgan T Barlow
(74) *Attorney, Agent, or Firm* — Kilpatrick Townsend and Stockton LLP

(57) ABSTRACT

An animal alignment support system includes a rod rotatably mounted on an animal enclosure and a rotation mechanism coupled with the rod to rotate the rod about a radial axis of the rod between a raised position and a lowered position. The system includes two horn cradles coupled with the rod and spaced apart from one another along the rod. At least a portion of each of the horn cradles extends downward and forward from the rod. In the raised position, the horn cradles are raised above a height of horns of an animal, thereby allowing the animal to pass below and move in front of the horn cradles. In the lowered position, at least a portion of each of the horn cradles is positioned below and behind the horns of the animal positioned within the animal enclosure, preventing the animal from backing up or lowering or turning its head.

20 Claims, 10 Drawing Sheets

(56) References Cited

U.S. PATENT DOCUMENTS

| | | | | |
|---|---|---|---|---|
| 944,379 A * | 12/1909 | Rada | A01K 1/0613 | 119/751 |
| 1,114,094 A * | 10/1914 | Apple | A01K 1/0613 | 119/735 |
| 1,323,072 A * | 11/1919 | Kuhlman | A01K 1/0613 | 119/734 |
| 1,510,832 A * | 10/1924 | Cudworth | A22B 5/02 | 119/730 |
| 1,681,565 A * | 8/1928 | Achenbach | A01K 17/00 | 606/204.55 |
| 1,717,531 A * | 6/1929 | Trees | A61D 3/00 | 119/722 |
| 1,746,975 A * | 2/1930 | Valentine | A63K 3/026 | 119/424 |
| 1,799,073 A * | 3/1931 | Thompson | A61D 3/00 | 119/734 |
| 2,165,937 A | 7/1939 | Nancarrow | | |
| 2,278,298 A * | 3/1942 | Young | A61D 3/00 | 119/726 |
| 2,576,654 A * | 11/1951 | Thorson | A01K 1/0613 | 119/733 |
| 2,650,567 A * | 9/1953 | Whitworth | A01K 1/0613 | 119/733 |
| 2,699,783 A * | 1/1955 | Sears | A01K 17/00 | 606/163 |
| 2,718,214 A * | 9/1955 | Walker | A01L 13/00 | 119/726 |
| 2,737,153 A * | 3/1956 | Dupont | A01K 1/0613 | 119/723 |
| 2,997,982 A * | 8/1961 | Trogdon | A01K 1/0613 | 119/734 |
| 3,030,921 A * | 4/1962 | Sanderson | A01K 1/0613 | 119/736 |
| 3,051,127 A | 8/1962 | Norbury | | |
| 3,064,623 A | 11/1962 | Riggs | | |
| 3,167,054 A * | 1/1965 | Pemberton | A01K 15/006 | 119/837 |
| 3,315,668 A * | 4/1967 | Kellner | A01K 17/00 | 119/837 |
| 3,572,294 A * | 3/1971 | Baker | A01K 1/0613 | 119/517 |
| 4,133,295 A | 1/1979 | Jones | | |
| 4,302,908 A | 12/1981 | Parker | | |
| 4,432,306 A * | 2/1984 | Rossa | A61D 3/00 | 119/725 |
| 4,513,690 A * | 4/1985 | Waldron | A61D 3/00 | 119/733 |
| 4,517,924 A | 5/1985 | McCan et al. | | |
| 4,702,200 A * | 10/1987 | Simington | A61D 3/00 | 119/734 |
| 4,771,737 A | 9/1988 | Lynch | | |
| 4,805,558 A * | 2/1989 | Lehmann | A01K 15/028 | 119/161 |
| 4,967,693 A * | 11/1990 | Prue | A01K 15/02 | 119/517 |
| 5,738,045 A * | 4/1998 | Bleacher | A01K 1/0613 | 119/751 |
| 5,908,009 A | 6/1999 | Cummings | | |
| 5,960,746 A * | 10/1999 | Salts | A01K 1/0613 | 119/756 |
| 6,176,203 B1 * | 1/2001 | Rousseau | A01K 15/028 | 119/517 |
| 8,230,821 B2 * | 7/2012 | Kerns | A01K 1/0606 | 119/729 |
| 2007/0209603 A1 * | 9/2007 | Steinfort | A01K 15/00 | 119/728 |
| 2015/0194142 A1 * | 7/2015 | Roberts | G10K 1/07 | 43/2 |
| 2015/0359233 A1 * | 12/2015 | Callicrate | A22B 1/00 | 452/55 |
| 2017/0360000 A1 * | 12/2017 | Gipson | A01K 1/0613 | |

FOREIGN PATENT DOCUMENTS

| | | | | |
|---|---|---|---|---|
| CH | 98963 A * | 5/1923 | | A01K 17/00 |
| CH | 99912 A * | 7/1923 | | A01K 17/00 |
| CH | 292324 A * | 8/1953 | | A01K 17/00 |
| CH | 301711 A * | 9/1954 | | A01K 17/00 |
| DE | 1801796 A1 * | 5/1970 | | A01K 1/06 |
| DE | 2420842 A1 * | 11/1975 | | A01K 15/00 |
| DE | 2739993 A1 * | 3/1979 | | A01K 1/062 |
| DE | 3510257 A1 * | 9/1986 | | A01K 1/062 |
| DE | 3544784 A1 * | 6/1987 | | A01K 1/06 |
| DE | 3824337 A1 * | 1/1990 | | A01K 1/06 |
| DE | 4017394 A1 * | 1/1991 | | A01K 1/0606 |
| FR | 574077 A * | 7/1924 | | A01K 17/00 |
| FR | 778109 A * | 3/1935 | | A01K 15/04 |
| FR | 2320048 A1 * | 3/1977 | | A01K 1/0606 |
| FR | 2350052 A1 * | 12/1977 | | A01K 1/0606 |
| FR | 2419020 A1 * | 10/1979 | | A01K 1/062 |
| GB | 635640 A * | 4/1950 | | A01K 1/0606 |
| GB | 657215 A * | 9/1951 | | A01K 15/003 |

* cited by examiner

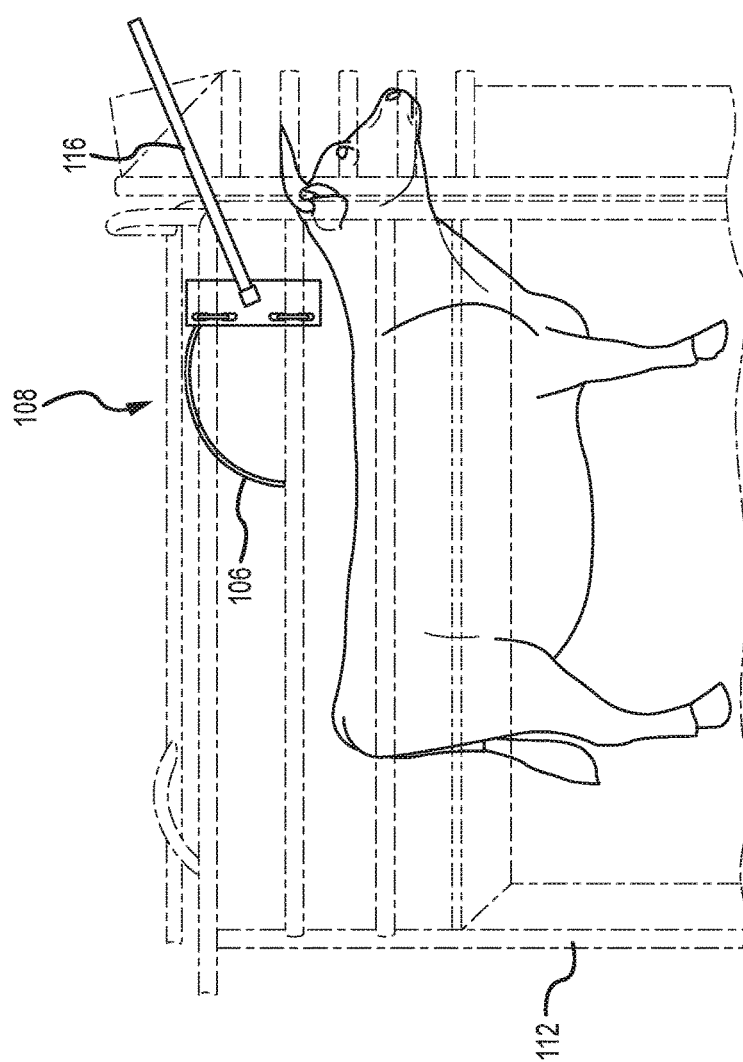

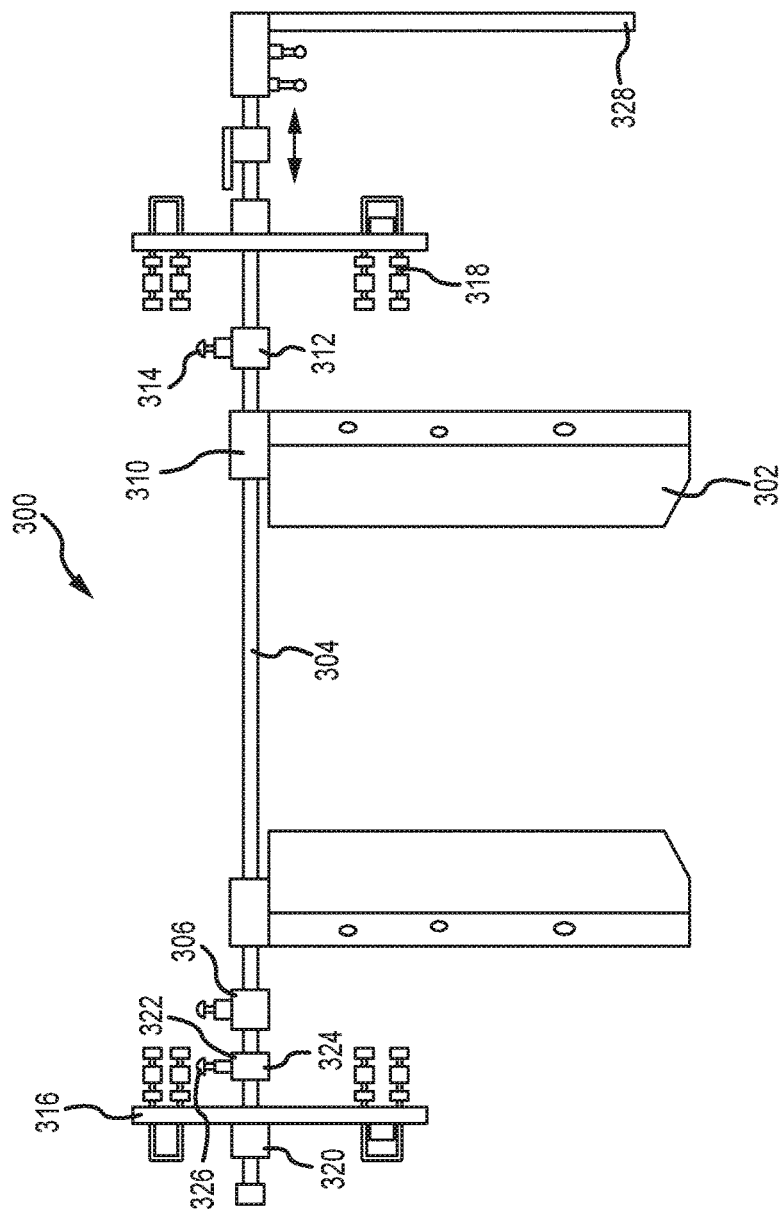

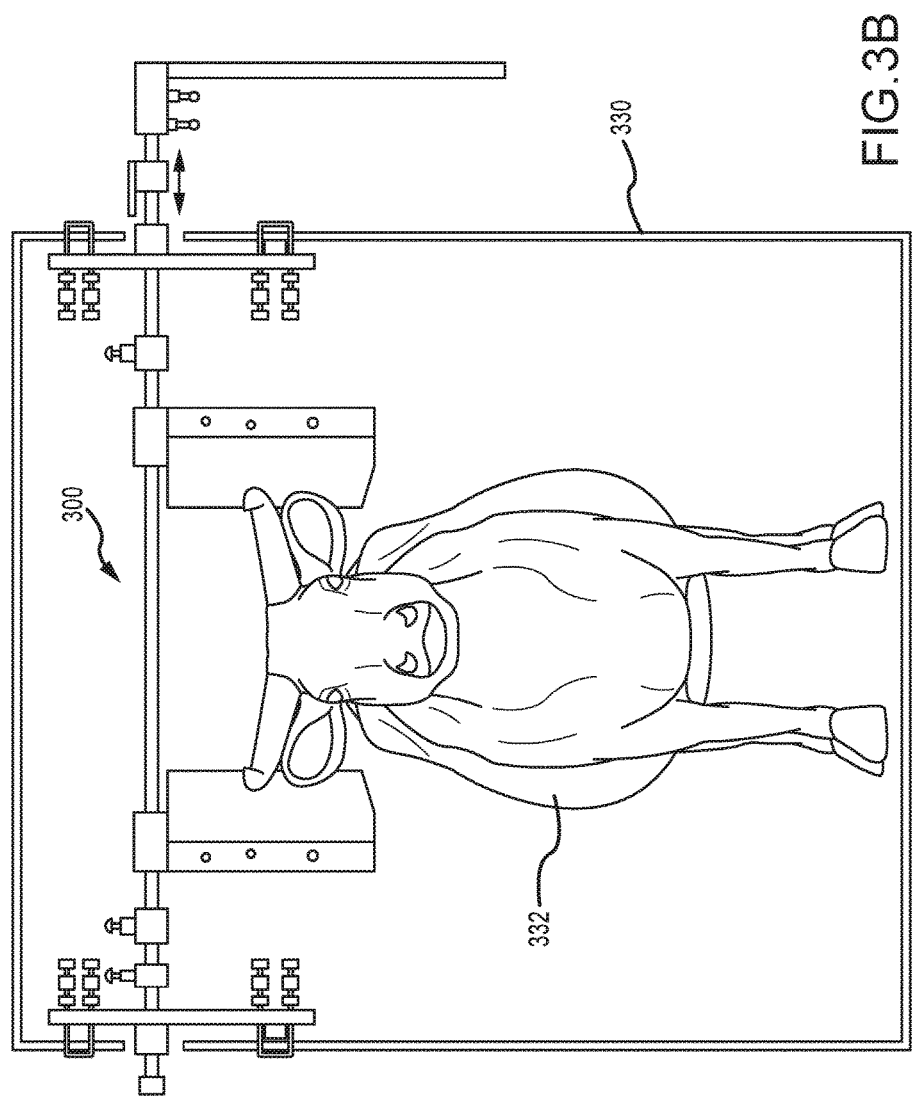

ANIMAL ALIGNMENT SUPPORT SYSTEM

CROSS-REFERENCES TO RELATED APPLICATIONS

This Application claims priority to U.S. Provisional Patent Application No. 62/176,240 filed Feb. 13, 2015, entitled "ANIMAL ALIGNMENT SUPPORT SYSTEM," the entire disclosure of which is hereby incorporated by reference, for all purposes, as if fully set forth herein.

BACKGROUND OF THE INVENTION

Rodeo and western events, both in practice and in competition require the participation of livestock. Many of these events start with an animal being positioned within a livestock chute enclosure. This requires getting the animal's head and body positioned appropriately near a front of the chute enclosure (facing forward with its head up), which can be difficult and time consuming. For example, upon entering the chute enclosure, the animal may immediately begin moving its head and body out of position. This can cause a delay in the event as the animal must be in the proper position prior to commencing the activity. Furthermore, such a delay may cause problems such as anxiety and nervousness to the animal, contestant(s)/participant(s), and/or other animals being utilized during the event, such as horse(s) of the participant(s). Any such problem may directly impact the competition and thus have significant competitive and/or monetary implications.

Additionally, when first training an animal in preparation for a competition the animals first interaction with the chute enclosure may form lasting, sometimes unbreakable, habits. Thus, any time the animal's first reaction is to move its head or body out of position, the result may be that the animal is never in the proper position upon entering a chute enclosure for any subsequent practice or competition.

BRIEF SUMMARY OF THE INVENTION

The present invention relates generally to systems and methods for properly positioning animals within a livestock chute enclosure. More specifically, embodiments provide solutions to ensure that an animal faces forward with its head up and looking forward through the front gates of the chute enclosure by rotating a number of horn cradles into a position behind and below the animal's horns or antlers to prevent the animal from being able to back up, turn its head, or lower its head, or lowering the front part of the animal's body by moving to its front knees.

In one aspect, an animal alignment support system is provided. The animal alignment support system may include a rod configured to be rotatably mounted on an animal enclosure and a rotation mechanism coupled with the rod and configured to rotate the rod about a radial axis of the rod between a raised position and a lowered position. The animal alignment support system may also include two horn cradles operably coupled with the rod and spaced apart from one another along a length of the rod. At least a portion of each of the two horn cradles may extend downward and forward from the rod. In the raised position, the two horn cradles may be raised above a height of horns or antlers of an animal, thereby allowing the animal to pass below and move in front of the two horn cradles. In the lowered position, at least a portion of each of the two horn cradles may be positioned below and behind the horns or the antlers of the animal positioned within the animal enclosure, thereby preventing the animal from backing up, lowering or turning its head, or positioning itself on its front knees.

In another aspect, an animal alignment support system is provided. The animal alignment support system may include an animal enclosure configured to receive a single animal and a rod configured to be rotatably mounted on the animal enclosure. The animal alignment support system may also include a rotation mechanism coupled with the rod and configured to rotate the rod about a radial axis of the rod between a raised position and a lowered position. The animal alignment support system may further include two horn cradles operably coupled with the rod and spaced apart from one another along a length of the rod. Each of the two horn cradles may include an arc-like curved portion that extends downward and forward from the rod. In the raised position, the two horn cradles may be raised above a height of horns or antlers of an animal, thereby allowing the animal to pass below and move in front of the two horn cradles. In the lowered position, at least a portion of each of the two horn cradles may be positioned below and behind the horns or the antlers of the animal positioned within the animal enclosure such that the horns or the antlers of the animal are positioned on a concave side of the arc-like curved portion, thereby preventing the animal from backing up or from lowering or turning its head.

In another aspect, a method for positioning an animal within an animal enclosure is provided. The method may include actuating a rotation mechanism, manually, electronically, pneumatically, and/or hydraulically to rotate a rod coupled with two horn cradles to a raised position such that the two horn cradles are raised above a height of horns or antlers of an animal, thereby allowing the animal to pass below and move in front of the two horn cradles. The method may also include positioning the animal within an animal enclosure such that the two horn cradles in the raised position are above and behind horns or antlers of the animal. The method may further include actuating the rotation mechanism to rotate the rod to a lowered position such that at least a portion of each of the two horn cradles is positioned below and behind the horns or the antlers of the animal positioned within the animal enclosure, thereby preventing the animal from backing up, lowering or turning its head, or moving to its front knees.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1B depicts another view of the livestock chute enclosure and alignment support system of FIG. 1A according to embodiments.

FIG. 3A depicts an alignment support system according to embodiments.

FIG. 3B depicts another view of the alignment support system of FIG. 3A according to embodiments.

DETAILED DESCRIPTION OF THE INVENTION

Embodiments of the present invention include animal alignment support systems that includes a number of horn cradles in a lowered position behind and below the animal's horns or antlers to prevent the animal from being able to back up, turn its head, lower its head, or move to its knees while in a livestock chute enclosure. Oftentimes, the horn cradles merely serve as a precautionary measure, with the horn cradles not contacting any part of the animal. However, should an animal attempt to back up, turn its head, put its head down, or move to its front knees, the animal's horns or antlers will contact the horn cradles, blocking the animal's movement and reinforcing an ideal start position for the animal. The horn cradles may be rotatably moved between the lowered position and a raised position in which an animal entering the livestock chute enclosure may pass under the horn cradles to move toward a front of the livestock chute enclosure. By lowering the horn cradles in a controlled manner, the animal may be maintained in a proper position without any discomfort and oftentimes without any contact between the horns or antlers and the horn cradles. In some embodiments, the animal alignment support system may be removable from a livestock chute enclosure such that they may be transported for use on a different livestock chute enclosure or other animal enclosure.

While discussed largely in the context of use in livestock chute enclosures designed for use in rodeo and western events, it will be appreciated that such animal alignment support systems may also be used in other applications where maintaining a position of a horned or antlered animal is important. For example, the animal alignment support system may be used for branding animals, veterinary work, animal handling, and the like. Additionally, any wild or domestic animal having horns or antlers, such as but not limited to cattle, goats, bison, and deer, may be aligned and supported using the systems described herein.

Figure 1A:
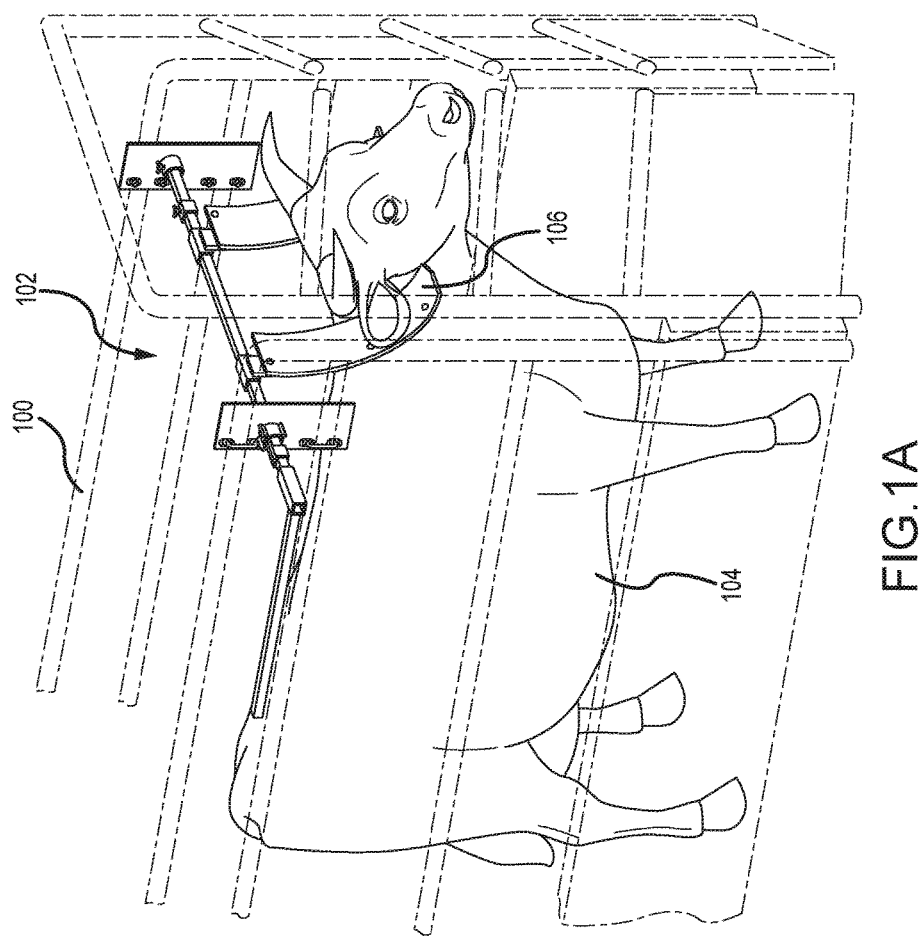
FIG. 1A depicts a livestock chute enclosure and alignment support system according to embodiments.

FIG. 1A depicts one embodiment of a livestock chute enclosure 100 and an animal alignment support system 102 configured to maintain an animal 104 in a proper position prior to a rodeo competition such as team roping, steer roping, and/or steer wrestling. The proper position is one in which the animal is standing upright, with its head up and facing forward near a front of the livestock chute enclosure 100. The animal 104, is positioned with a pair of horn cradles 106 of animal alignment support system 102 positioned below and behind the animal's horns. The horn cradles 106 prevent the animal 104 from backing up, turning its head, lowering its head, or moving to its front knees while in livestock chute enclosure 100. If the animal 104 attempts to do one of these actions, the animal's horns will contact horn cradles 106 and restrict any further incorrect movement, thus maintaining the animal 104 in a heads up position with the animal's head and eyes facing forward providing the animal an appropriate starting position when the front chute gates are opened.

Figure 1C:
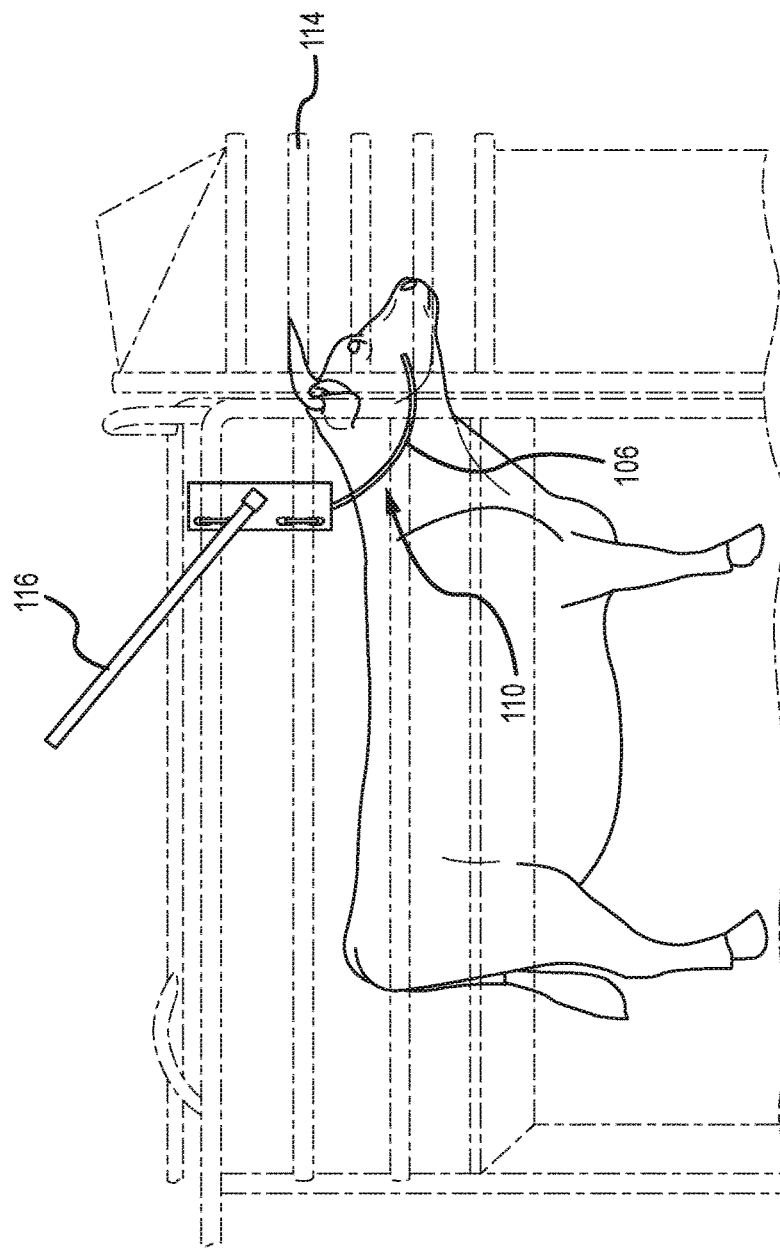
FIG. 1C depicts another view of the livestock chute enclosure and alignment support system of FIG. 1A according to embodiments.

FIGS. 1B and 1C show a side view of livestock chute enclosure 100. Animal alignment support system 102 may be maneuvered between a raised position 108 shown in FIG. 1B and a lowered position 110 shown in FIG. 1C. In the raised position 108, horn cradles 106 are rotated such that they are above where an animal's horns or antlers are as they enter the enclosure. In this position, an animal may enter through a rear gate 112 of the livestock chute enclosure 100 with the front gates in a closed position. Once the animal is near the front of the livestock chute enclosure 100, the animal alignment support system 102 may be rotated to the lowered position 110. In the lowered position 110, the horn cradles 106 are positioned below and behind the animal's horns or antlers to prevent the animal from backing up, turning its head, lowering its head, or moving to its front knees while in livestock chute enclosure 100. Once the animal is properly positioned within the livestock chute enclosure 100 with the animal alignment support system 102 in the lowered position, the animal may be released from livestock chute enclosure 100 by opening a front gate 114, allowing the animal to move forward out of the livestock chute enclosure 100. In some embodiments, a user may grasp and move handle 116 to rotate the animal alignment support system 102. In other embodiments, a motor, such a pneumatic, hydraulic, or electric motor, may be activated, which causes the animal alignment support system to rotate between the raised position and the lowered position. In some embodiments, the motor may be controlled by a remote control, a button, a mobile phone, or other control mechanism. For example, a radio frequency or Bluetooth® interface with the motor may communicate with a control device, such as a user's mobile phone or other remote control device.

Figure 2:
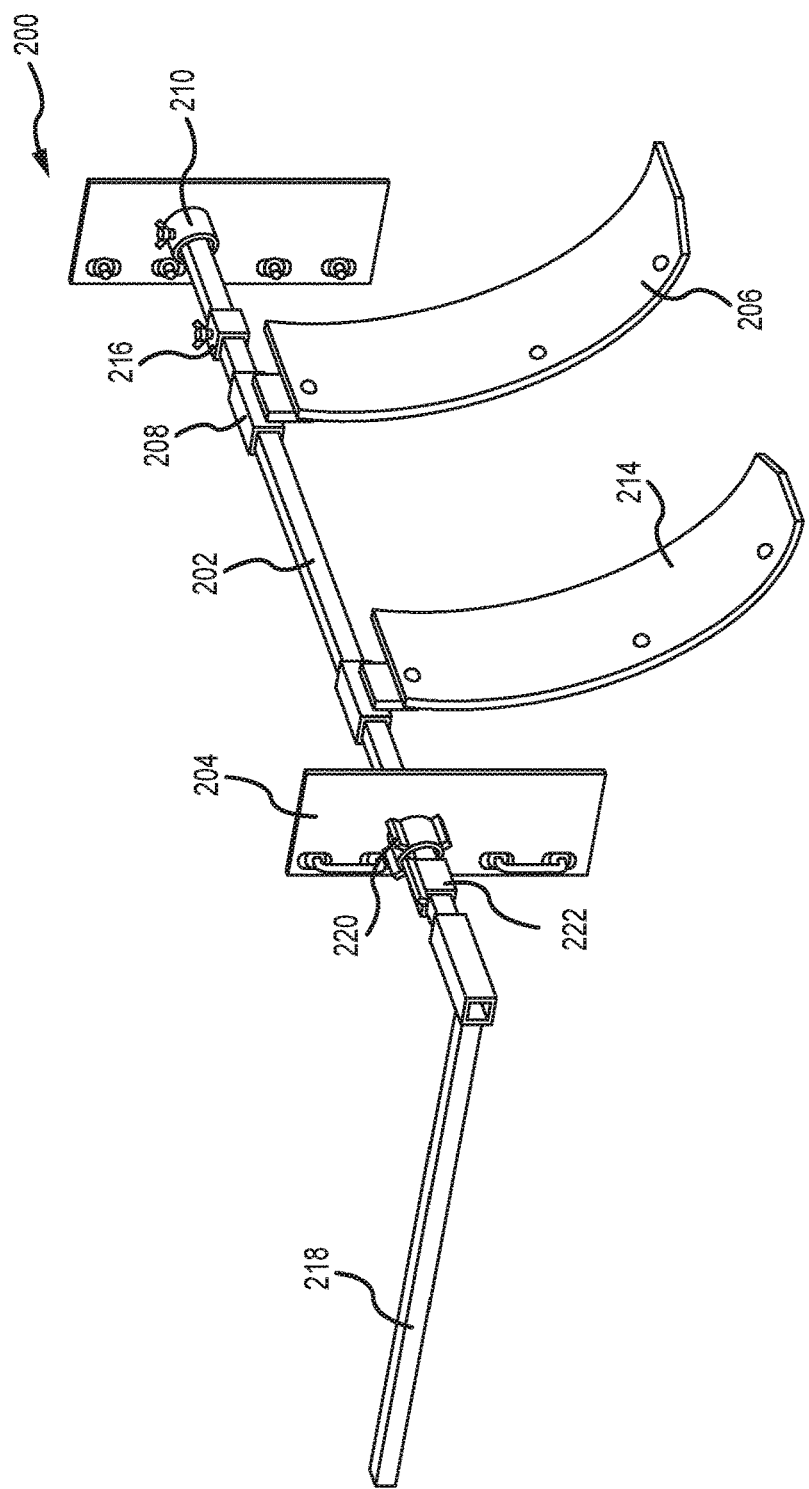
FIG. 2 depicts an alignment support system according to embodiments.

FIG. 2 depicts an animal alignment support system 200, which may be the same as animal alignment support system 102 described above. Animal alignment support system 200 includes a rod 202 that is positioned between two mounting plates 204. Mounting plates 204 may be removably coupled with an animal enclosure, such as a livestock chute enclosure and allow the animal alignment support system 200 to be mounted on the animal enclosure. For example, mounting plates 204 may be attached onto or otherwise secured to the animal enclosure. In some embodiments, rod 202 may be directed mounted to an animal enclosure, such as a livestock chute enclosure, without the mounting plates 204 and/or mounting plates 204 may be part of the animal enclosure itself. In some embodiments, rod 202 is between about 36 inches and 48 inches in length, although the actual length may vary based on factors such as a size of the animal enclosure and what type of rotation mechanism is used. Rod 202 is rotatable relative to the mounting plates 204, allowing the animal alignment support system 200 to be maneuvered between a raised position that allows an animal access to a livestock chute enclosure and a lowered position that prevents undesirable animal movement. For example, rod 202 may be received by a collar 210 of mounting plates 204 and may extend though all or part of mounting plates 204. Collar 210 and/or another receiving mechanism may have a circular and/or otherwise shaped interior receptacle with at least a slightly larger diameter than rod 202 such that rod 202 may rotate therein, regardless of a cross-sectional shape of rod 202. While shown here with a square cross-section, it will be appreciated that rod 202 may have a cross-section of another shape, such as a circle, triangle, hexagon, octagon, or other shape. Additionally, in some embodiments, rod 202 may not be uniform along its entire length. For example, rod 202 may have a circular cross-section near its ends to enable smooth rotation within the mounting plates 204, while having a square cross-section in a center portion that more easily transfers rotational force to other components of the animal alignment support system 200.

Two horn cradles 206 may be attached to the rod 202 such that when the rod is rotated, the horn cradles 206 also rotate. In some embodiments, horn cradles 206 may be slidable or otherwise movable along rod 202 such that a position of the horn cradles 206 may be adjusted. This allows a single animal alignment support system 200 to be used with different sizes of animals, such as for animal of different breeds, ages, and the like. For example, each horn cradle 206 may include a collar 208 that is sized to slidably receive rod 202. Each collar 208 may be slid to a desired position along rod 202. The design/weight of the horn cradle 206 may be sufficient to prevent the horn cradle 206 from sliding on its own, thereby ensuring that each horn cradle 206 stays in the desired position. In some embodiments, the animal alignment support system 200 may include stops 216, which set a maximum and/or minimum distance between the horn cradles 206. For example, stops 216 may be collars configured to receive rod 202 and may include a set screw or other fastening device that may prevent the stop 216 from moving along the rod 202. Stops 216 may be positioned on one or both sides of a horn cradle 206 to set a position and/or a maximum amount of adjustability for the horn cradle 206 along rod 202. In other embodiments, horn cradles 206 may be positioned and secured on rod 202 using other mechanisms. For example, horn cradles 206 may be clamped on the rod 202. The use of clamps allows the horn cradles 206 to be quickly repositioned and removed from rod 202. In yet other embodiments, the horn cradles 206 may be bolted onto rod 202. For example, rod 202 and/or horn cradles 206 may define one or more apertures through which a bolt may be placed to secure the components together. In other embodiments, horn cradles 206 may include a set screw that may be tightened against rod 202 to set a position of each of the horn cradles 206. While several mechanisms for securing the horn cradles 206 and rod 202 have been described, it will be appreciated that other known methods for fixedly or removably coupling two components may be used, such as welding, press or slip fit connections, the use of additional fastening mechanisms, and the like.

Horn cradles 206 may be shaped, contoured, and/or angled such that they may be positioned both behind and below an animal's horns or antlers. As shown here, horn cradles 206 have an arc-like curved contour. The curved contour includes a concave portion 214 within which the animal's horns or antlers are positioned when the animal alignment support system is in the lowered position. Other shapes of horn cradles 206 may also be used. For example, L-shaped and/or straight horn cradles may be used in some embodiments. Horn cradles 206 may include any combination of straight, angular, and/or contoured portions that allow the horn cradles to be behind and below the animal's horns or antlers when in the lowered position. In some embodiments, horn cradles 206 may have a total length of between about 10 inches and 45 inches, with a width between about 2 inches and 10 inches. Curved horn cradles 206 may have a radius of curvature of between about 6 inches and 24 inches. It will be appreciated that other sizes and configurations of horn cradles may be used based on particular needs, such as an animal size, horn size and/or shape, and/or enclosure size.

Animal alignment support system 200 may include a handle 218 that is coupled with rod 202 and configured to rotate rod 202 and horn cradles 206. In some embodiments, handle 218 may be coupled with a portion of the rod 202 that extends through a mounting plate 204 and/or animal enclosure. For example, handle 218 may slid onto or otherwise be coupled with or near an end of rod 202. A portion of handle 218 may be sized and shaped to receive a portion of rod 202 such that upon rotating handle 218, rod 202 also rotates relative to mounting plates 204 and/or the animal enclosure. While shown here with handle 218 on the left side of the animal alignment support system 200, it will be appreciated that the handle 218 may be positioned on either side of animal alignment support system 200. In some embodiments, handle 218 may be between about 12 inches and 36 inches in length, with longer handles 218 providing a greater mechanical advantage to make animal alignment support system 200 easier to rotate. Additionally, other types and shapes of handles may be used to rotate animal alignment support system 200. Alternatively, or in addition to, using handle 218, rotation of animal alignment support system 200 may be applied by one or more motors, such as an electric, hydraulic, or pneumatic motor that may be activated to rotated the animal alignment support system 200 between a raised position and a lowered position.

In some embodiments, animal alignment support system 200 may have a lock mechanism 220 to lock the rotation of the animal alignment support system 200 such that the animal alignment support system 200 remains in either the raised position or the lowered position. Lock mechanism 220 may include one or more protrusions that are fixed in place. For example, the protrusions may extend from one or both of the mounting plates 204. A slidable lock collar 222 may be configured to slide along a length of rod 202 and to rotate along with rod 202. Lock collar 222 may include one or more mating features that are configured to contact at least one of the protrusions to prevent rod 202 from rotating. For example, the mating features may include one or more protrusions or channels that may engage the protrusions on the mounting plates 204 and provide contact force to prevent further rotation. The lock collar 222 may be slid along rod 202 between an unlocked position in which the mating features do not contact the protrusions, thus allowing rotation, and a locked state in which the mating features engage the protrusions to lock the rotation of the animal alignment support system 200. It will be appreciated that other locking mechanisms may be used, such as a ratchet and pawl lock, a flange that sits against a mounting plate 204 that may be locked using a set screw, and other known rotational locking mechanisms.

Animal alignment support system 200 may be formed of any rigid or semi rigid material that can prevent an animal from moving back, dropping its head, turning its head, or moving to its knees. For example, some or all of animal alignment support system 200 may be formed from metal, plastic, wood, composites, and/or other synthetic materials. In some embodiments, some or all of the animal alignment support system 200 may be formed from and/or coated with a flexible or soft material, such as rubber, plastic, or cloth. For example, horn cradles 206 may be coated with a rubber, plastic, cloth, synthetic material, and/or other material to soften any impact made with an animal's horns or antlers, thereby preventing damage to the horns or antlers and preventing the animal from being subject to any discomfort.

Animal alignment support system 200 may be designed to be removably coupled onto an animal enclosure, such as using bolts or other fastening mechanisms. Animal alignment support system 200 may be quickly disassembled such that the animal alignment support system 200 may be moved to another site and/or another animal enclosure. For example, the entire assembly may be unbolted, unclamped, slid apart, and/or otherwise disassembled by a single person in a matter of minutes. Similarly, due to its simple construction, the animal alignment support system 200 may be quickly reassembled for used with another animal enclosure. Animal alignment support system 200 may be sized and shaped to be able to accommodate a number of different types of animals and/or animal enclosures. In some embodiments, the horn cradles 206 may have shapes other than those shown herein. The shape and/or size of the horn cradles 206 may be determined based on a size of the animal and/or a size and shape of its horns or antlers.

FIG. 3A shows an animal alignment support system 300, similar to animal alignment support system 200 described above. Animal alignment support system 300 includes a pair of horn cradles 302 spaced apart along a rod 304. Horn cradles 302 may be slidingly or otherwise movably coupled with rod 304. Here, horn cradles 302 each may include a set screw (not shown) positioned through a collar 310 that is configured to receive rod 304. Once slid or otherwise positioned at a desired location along rod 304, the set screw may be tightened against rod 304 to secure the horn cradle 302 in the desired position. The position of horn cradles 302 may be adjusted by loosening the set screw and sliding the horn cradles 302 to a new position along rod 304. An adjustment limit of each the horn cradles 302 may be set using one or more stops 306. Stops 306 may be positioned on one or both sides of each of the horn cradles 302 and serve as physical barriers that set limits to where the horn cradles 302 may be positioned. Stops 306 may include a collar 312 that may slide along rod 304. A set screw 314 may extend through collar 312 and press against rod 304 to secure each stop 306 in place.

Rod 304 may be rotatably coupled with mounting plates 316. For example, a portion of rod 304 may be received within an aperture defined by a collar 320 of each mounting plate 316. Rod 304 may extend through all or part of collar 320. Mounting plates 316 may be configured to be mounted on an animal enclosure, such as a livestock chute enclosure. In some embodiments, mounting plates 316 may be bolted onto an animal enclosure, such as by using straight bolts, J-bolts, U-bolts, and/or secured using any permanent or removable fastening mechanism 318. Plates may be assembled within, inside, and/or outside of the enclosure structure. In some embodiments, a stop 322 may be positioned on rod 304 near each mounting plate 316. Stop 322 may include a collar 324 that receives rod 304. Collar 324 may be slid into a desired position near a mounting plate 316 and set in position using set screw 326. Stop 322, once secured, may prevent the rod 304 from being pulled through collar 320 of mounting plate 316 such that rod 304 is secured in a proper position without any risk of unwanted disassembly of animal alignment support system 300. Animal alignment support system 300 may also include a handle 328 that is coupled with rod 304 and configured to apply rotational force to the rod 304 to rotate the animal alignment support system 300 between a lowered position and a raised position.

FIG. 3B shows animal alignment support system 300 in a lowered position on a livestock chute enclosure 330. Here, animal 332 is positioned in front of the horn cradles 302 such that the animal's horns or antlers are positioned in front of and above the horn cradles 302. In this embodiment, horn cradles 302 extend down from rod 304 and curve forward, forming an arc with a concave side positioned proximate to the horns. The horn cradles 302 ensure that the animal 332 cannot back up, lower its head, turn its head, or move to its knees, as any of these actions will result in the horns contacting one or both of the horn cradles 302, which act as barriers to such movement. In some embodiments, animal alignment support system 300 may be positioned on livestock chute enclosure 330 at a height of between about 36 inches and 72 inches as measure from the ground to the rod 304, although other mounting heights may be used based on factors such as a type of livestock chute enclosure 330, a size of the animal, a size and/or position of the horns or antlers of the animal, and the like.

Figure 4A:
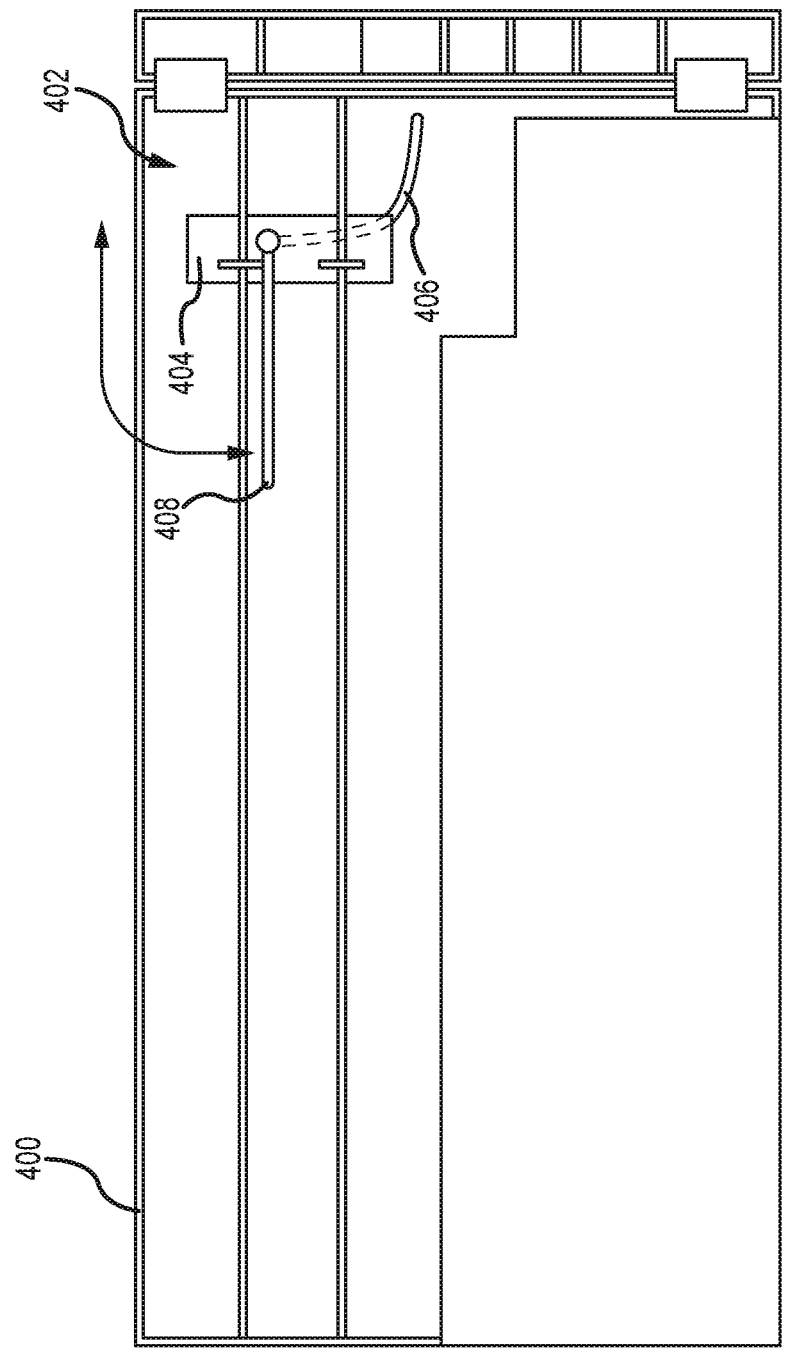
FIG. 4A depicts a livestock chute enclosure and alignment support system according to embodiments.
Figure 4B:
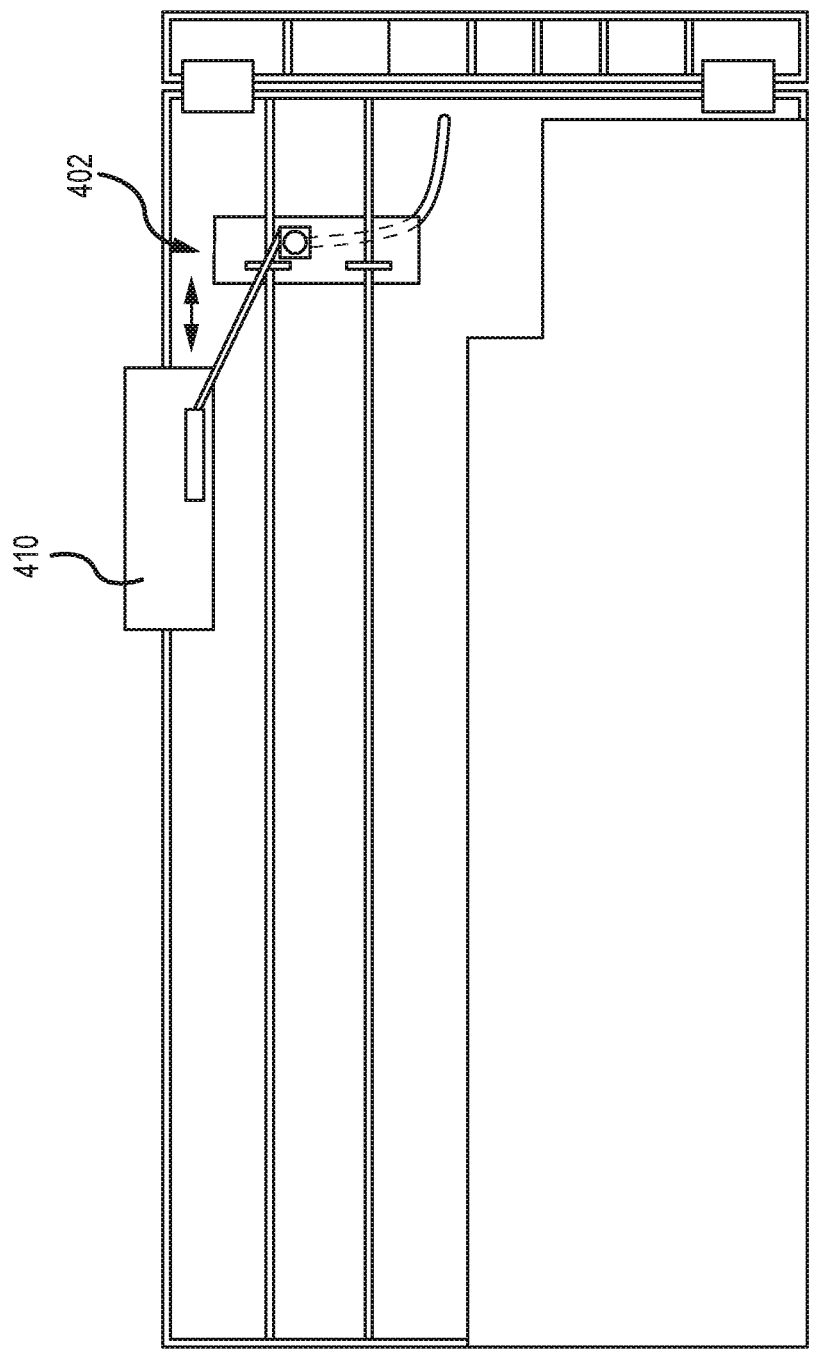
FIG. 4B depicts another view of the livestock chute enclosure and alignment support system of FIG. 4A according to embodiments.

FIG. 4A depicts a side view of a livestock chute enclosure 400 having a n animal alignment support system 402. Alignment support system 402 may be similar to those described above and may be mounted onto livestock chute enclosure 400, such as by bolting a mounting plate 404 onto a portion of the livestock chute enclosure 400. Alignment support system 402 may include horn cradles 406 that may be rotated along the arrows between a raised position where the horn cradles 406 are raised and the tips of horn cradles 406 point downward and a lowered position shown in FIGS. 4A and 4B. In the raised position of FIG. 4A, horn cradles 406 may be elevated above a height of an animal (not shown) within the livestock chute 400. This position allows the animal to be brought to a front of the livestock chute 400 such that the animal's head may be positioned forward of the horn cradles 406. In some embodiments, a handle 408 may be used to manually rotate the horn cradles 406 down to the lowered position, while in other embodiments, such as shown in FIG. 4B, a motor 410, such as an electric, pneumatic, and/or hydraulic motor, may be used to rotate the horn cradles 406. In the lowered position shown in FIG. 4B, horn cradles 406 extend downward and forward from a top of the animal alignment support system 402. This allows the horn cradles 406 to be positioned below and behind the horns of the animal to prevent the animal from backing up, turning its head, lowering its head, or moving to its front knees. While not necessarily touching the horns at all times, any of the above animal movements will cause the animal's horns or antlers to contact the horn cradles 406, which thereby corrects the stance and movement of the animal.

Figure 5B:
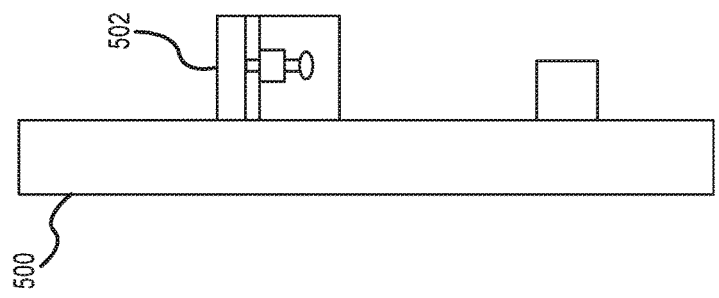
FIG. 5B depicts another view of the mounting plate of FIG. 5A according to embodiments.
Figure 5A:
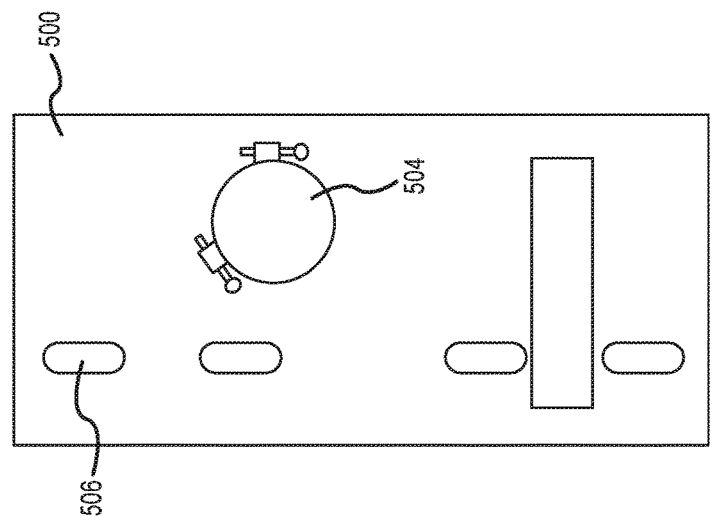
FIG. 5A depicts a mounting plate according to embodiments.

FIGS. 5A and 5B depict one embodiment of a mounting plate 500 that may be used to mount an animal alignment support system to an animal enclosure. While shown in FIG. 5A as being rectangular, it will be appreciated that other shapes and designs of mounting plates 500 may be used. Mounting plate 500 includes a collar 502 that defines an aperture 504. In some embodiments, aperture 504 extends entirely through mounting plate 500 and collar 502, allowing a rod of an animal alignment support system to extend entirely through the mounting plate 500. This may allow a handle to be coupled with the rod on an outside of the mounting plate 500 and the animal enclosure. In other embodiments, the aperture 504 may extend only partially through the collar 502 and/or mounting plate 500, thereby constraining an end of the rod within the limits of the animal enclosure and mounting plate 500. The rod may be rotatably received within aperture 504, allowing the rod and horn cradles to rotate while the mounting plate 500 remain stationary relative to the animal enclosure. As shown in FIG. 5B, collar 502 may extend outward from one or more major surfaces of the mounting plate 500. Collar 502 may provide additional support for the rod. In some embodiments, a lock mechanism (not shown) may be included on or fastened with the mounting plate 500 such that rotation of the rod and horn cradles may be presented in a locking position. Mounting plate 500 also may define one or more openings 506 that are configured to receive bolts or other fasteners. Such fasteners may be used to secure the mounting plate 500 to the animal enclosure. It will be appreciated that in some embodiments, mounting plate 500 may include no openings 506, and other coupling mechanisms may be used. For example, clamps, other fasteners, welding, magnetism, and/or other coupling techniques known in the art may be used to secure the mounting plate 500 to the animal enclosure.

Figure 6:
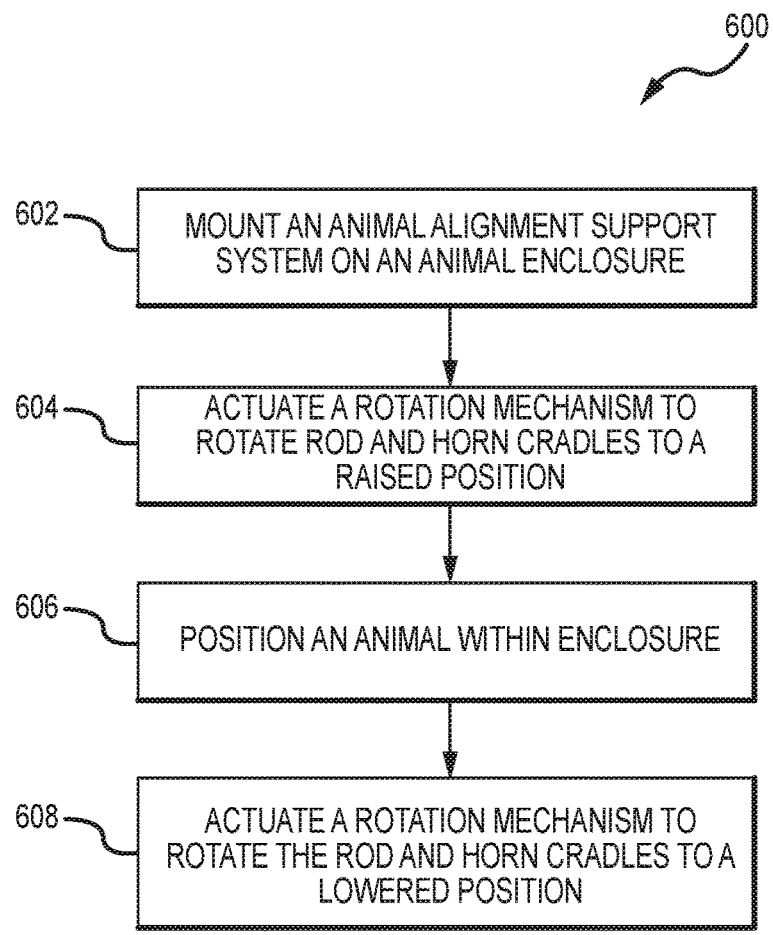
FIG. 6 is a flowchart of a process for positioning an animal within an animal enclosure according to embodiments.

FIG. 6 is a flowchart depicting a process 600 for positioning an animal within an animal enclosure. Process 600 may be used in conjunction with the animal alignment support systems and livestock chute enclosures described herein. Process 600 may begin by mounting an animal alignment support system on an animal enclosure, such as a livestock chute enclosure at block 602. This may involve fully assembling the animal alignment support system or merely just fastening or otherwise securing the animal alignment support system to the enclosure. For example, the animal alignment support system may include one or more mounting plates that need to be bolted or otherwise fastened to the enclosure. In other embodiments, the animal alignment support system may be welded or otherwise permanently attached to the enclosure. In some embodiments, process 600 may include positioning the two horn cradles along a length of the rod based on a size of the animal. For example, a smaller animal may require the horn cradles to be positioned closure together than required with a larger animal.

At block 604, a rotation mechanism is actuated to rotate a rod coupled with two horn cradles of the animal alignment support system to a raised position. In the raised position, the two horn cradles are raised above a height of horns or antlers of an animal, thereby allowing the animal to pass below and move in front of the two horn cradles. In some embodiments, actuating the rotating mechanism involves activating a pneumatic motor, a hydraulic motor, and/or an electric motor to rotate the rod, while in other embodiments, a handle is provided such that a user may manually rotate the rod. In some embodiments, each of the two horn cradles includes an arc-like curve and the horns or the antlers of the animal may be positioned on a concave side of the arc-like curve when the rod is in the lowered position. Thus, the concave side acts as a cradle to resist backward, side-to-side, and downward movement of the animal's head and body.

An animal is then positioned within an animal enclosure such that the two horn cradles in the raised position are above and behind horns or antlers of the animal at block 606. For example, the animal may be moved by a handler toward a front portion of the animal enclosure until the animal's head and horns are entirely in front of the horn cradles. At block 608, the rotation mechanism is again actuated to rotate the rod to a lowered position. In the lowered position, at least a portion of each of the two horn cradles is positioned below and behind (possibly in contact with) the horns or the antlers of the animal positioned within the animal enclosure, thereby preventing the animal from backing up or from lowering or turning its head. In some embodiments, process 600 may also include engaging a lock mechanism to secure the rod in the raised position or the lowered position.

While discussed largely in the context of horn cradles that are rotatable into a lowered position behind and below an animal's horns or antlers, it will be appreciated that other mechanisms may be utilized to achieve similar effects without rotatable horn cradles. As just one example, horn cradles may be positioned along walls of the livestock chute enclosure in a proper orientation relative to an animal. Upon an animal being moved to the front of the livestock chute enclosure, the horn cradles may be slid or otherwise maneuvered inward from the walls into a position behind the animal's horns.

Specific details are given in the description to provide a thorough understanding of example configurations (including implementations). However, configurations may be practiced without these specific details. For example, well-known processes, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An animal alignment support system comprising:
    a rod configured to be rotatably mounted on an animal enclosure;
    a rotation mechanism coupled with the rod and configured to rotate the rod about a radial axis of the rod between a raised position and a lowered position; and
    two horn cradles, each of the horn cradles being operably coupled with the rod and spaced apart from one another along a length of the rod, wherein at least a portion of each of the two horn cradles extends downward and forward from the rod, wherein:
        in the raised position, the two horn cradles are raised above a height of horns or antlers of an animal, thereby allowing the animal to pass below without restriction and move in front of the two horn cradles; and
        in the lowered position, the two horn cradles are configured to directly obstruct a downward path of the horns or the antlers by positioning at least a portion of each of the two horn cradles below and behind a respective one of the horns or the antlers of the animal positioned within the animal enclosure so as to prevent the animal from backing up or from lowering or turning its head.

2. The animal alignment support system of claim 1, wherein:

the rotation mechanism comprises a handle configured to rotate the rod between the raised position and the lowered position.

3. The animal alignment support system of claim 1, wherein:
the rotation mechanism comprises one or more of a pneumatic, hydraulic, or electric motor.

4. The animal alignment support system of claim 1, wherein:
each of the two horn cradles comprises one or more of rubber, cloth, or plastic.

5. The animal alignment support system of claim 1, wherein:
each of the two horn cradles comprises an arc-shaped curve; and
the horns or the antlers of the animal are positioned on a concave side of the arc-like curve when the rod is in the lowered position.

6. The animal alignment support system of claim 1, wherein:
each of the two horn cradles is slidable along the rod such that a position of the two horn cradles may be set to accommodate animals of different sizes.

7. The animal alignment support system of claim 1, further comprising:
a lock mechanism configured to lock the rod in one or both of the raised position and the lowered position when engaged.

8. An animal alignment support system comprising:
an animal enclosure configured to receive a single animal;
a rod configured to be rotatably mounted on the animal enclosure;
a rotation mechanism coupled with the rod and configured to rotate the rod about a radial axis of the rod between a raised position and a lowered position; and
two horn cradles, each of the horn cradles being operably coupled with the rod and spaced apart from one another along a length of the rod, each of the two horn cradles comprising an arc-like curved portion that extends downward and forward from the rod, wherein:
in the raised position, the two horn cradles are raised above a height of horns or antlers of an animal, thereby allowing the animal to pass below and move in front of the two horn cradles; and
in the lowered position, the two horn cradles are configured to directly obstruct a downward path of the horns or the antlers by positioning at least a portion of each of the two horn cradles below and behind a respective one of the horns or the antlers of the animal positioned within the animal enclosure such that the horns or the antlers of the animal are positioned on a concave side of the arc-like curved portion so as to prevent the animal from backing up, turning or lowering its head, or moving to its knees.

9. The animal alignment support system of claim 8, wherein:
a position of each of the two horn cradles is adjustable relative to the rod such that the position of the two horn cradles may be set to accommodate animals of different sizes.

10. The animal alignment support system of claim 8, wherein:
the animal enclosure comprises a livestock chute enclosure used for rodeo and western events.

11. The animal alignment support system of claim 8, wherein:
the rod is removably mounted on the animal enclosure.

12. The animal alignment support system of claim 8, wherein:
the rotation mechanism comprises a handle configured to rotate the rod between the raised position and the lowered position.

13. The animal alignment support system of claim 8, further comprising:
a lock mechanism configured to lock the rod in one or both of the raised position and the lowered position when engaged.

14. The animal alignment support system of claim 8, wherein:
the rotation mechanism comprises one or more of a pneumatic, hydraulic, or electric motor.

15. A method for positioning an animal within an animal enclosure, the method comprising:
actuating a rotation mechanism to rotate a rod coupled with two horn cradles to a raised position such that the two horn cradles are raised above a height of horns or antlers of the animal, thereby allowing the animal to pass below and move in front of the two horn cradles;
positioning the animal within the animal enclosure such that the two horn cradles in the raised position are above and behind horns or antlers of the animal;
actuating the rotation mechanism to rotate the rod to a lowered position such that at least a portion of each of the two horn cradles is positioned below and behind the horns or the antlers of the animal positioned within the animal enclosure, thereby preventing the animal from backing up or from lowering or turning its head.

16. The method for positioning an animal within an animal enclosure of claim 15, further comprising:
engaging a lock mechanism to secure the rod in the raised position or the lowered position.

17. The method for positioning an animal within an animal enclosure of claim 15, further comprising:
positioning the two horn cradles along a length of the rod based on a size of the animal.

18. The method for positioning an animal within an animal enclosure of claim 15, wherein:
actuating the rotating mechanism comprises activating one or more of a pneumatic motor, a hydraulic motor, or an electric motor to rotate the rod.

19. The method for positioning an animal within an animal enclosure of claim 15, wherein:
actuating the rotating mechanism comprises rotating a handle coupled with the rod.

20. The method for positioning an animal within an animal enclosure of claim 15, wherein:
each of the two horn cradles comprise an arc-like curve; and
the horns or the antlers of the animal are positioned on a concave side of the arc-like curve when the rod is in the lowered position.

* * * * *